United States Patent
Starnes, Jr.

[15] 3,674,854
[45] July 4, 1972

[54] (3,5 DIALKYL-4-HYDROXY BENZYL-)TRIALKYL PHOSPHONIUM CHLORIDES AND CORRESPONDING ZWITTERIONS

[72] Inventor: William H. Starnes, Jr., Baytown, Tex.
[73] Assignee: Esso Research and Engineering Company
[22] Filed: Jan. 25, 1971
[21] Appl. No.: 109,556

Related U.S. Application Data
[62] Division of Ser. No. 845,486, July 28, 1968.

[52] U.S. Cl. ..................................260/606.5 F, 260/936
[51] Int. Cl. ..................................C07f 9/54, C07d 105/02
[58] Field of Search ..................................260/606.5 F, 936

[56] References Cited

UNITED STATES PATENTS 2,862,970  12/1958  Thielen..........................260/606.5 F
3,483,260  12/1969  Worrel..........................260/606.5 F Primary Examiner—Tobias E. Levow
Assistant Examiner—Werten F. W. Bellamy
Attorney—Thomas B. McCulloch, Melvin F. Fincke, John S. Schneider, Sylvester W. Brock, Jr., Kurt S. Myers and Timothy L. Burgess

[57] ABSTRACT

This invention relates to (3,5-dialkyl-4- hydroxy benzyl) trialkyl Phosphonium Chlorides and corresponding zwitterions which are useful as intermediates in the preparation of alkenyl phenols. The alkenyl phenols find utility as antioxidants for hydrocarbons and polyolefins.

4 Claims, No Drawings

3,674,854

1

(3,5 DIALKYL-4-HYDROXY BENZYL-)TRIALKYL PHOSPHONIUM CHLORIDES AND CORRESPONDING ZWITTERIONS

CROSS REFERENCE TO RELATED APPLICATION

This is a divisional application of Ser. No. 845,486 filed July 28, 1968, entitled "Hindered Alkenyl Phenols."

BACKGROUND OF THE INVENTION

1. Field of the Invention

The present invention is directed to the synthesis of hindered alkenyl phenols of the following general structure:

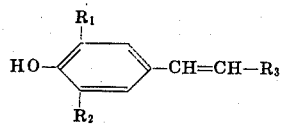

where $R_1$ and $R_2$ are alkyls having one to eight carbon atoms; and $R_3$ is selected from the group consisting of alkyl and aryl.

The synthesis of the present invention uses as a starting material the corresponding 2, 6-dialkyl-4-chloromethylphenol. The hindered alkenyl phenols are effective antioxidants, especially in polypropylene.

2. Prior Art

E. Zbiral, O. Saiko, and F. Wessely, *Monatshefte fur Chemie*, 95, 512 (1964); *Chem. Abstracts*, 61, 5525 (1964); A. Nickon and B. R. Aaronoff, *Journal of Organic Chemistry*, 27, 3379 (1962); 29, 3014 (1964).

SUMMARY OF THE INVENTION

The present invention is directed to the synthesis of hindered alkenyl phenols of the following structure:

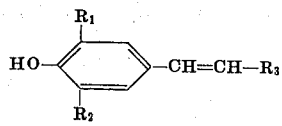

where $R_1$ and $R_2$ are alkyls having one to eight carbon atoms; and $R_3$ is selected from the group consisting of alkyl and aryl.

The synthesis method of the present invention involves the reaction of a chloromethylphenol and a trialkylphosphine to form an intermediate phosphonium chloride of the following structure;

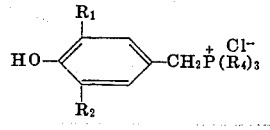

where $R_1$ and $R_2$ are lower alkyl and $R_4$ is a n-alkyl.

The intermediate phosphonium chloride is then reacted with a hydroxide or alkoxide in water or alcoholic solvent to yield the corresponding zwitterion (compound A) of the following formula:

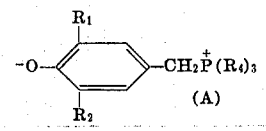

where $R_1$ and $R_2$ are lower alkyl and $R_4$ is a n-alkyl.

The zwitterion is then reacted with either an aromatic or an aliphatic aldehyde in an aprotic solvent to produce the hindered alkenyl phenols.

2

DESCRIPTION OF THE PREFERRED EMBODIMENTS

The hindered alkenyl phenols are produced according to the synthesis method of the present invention by starting with the chloromethylphenols of the following structure:

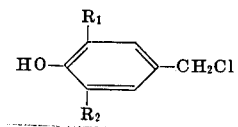

where $R_1$ and $R_2$ are lower alkyls.

While $R_1$ and $R_2$ may be $C_1$ to $C_8$ alkyls, preferably these substituents are tertiary alkyls such as t-butyl. The chloromethyl hindered phenol is reacted with a trialkylphosphine to form the corresponding intermediate phosphonium chloride. This reaction is carried out in an inert solvent such as benzene, petroleum ether and the like at temperatures from room temperature to the reflux temperature of the inert solvent. Using stiochiometric proportions, the phosphonium chloride usually precipitates from the solution in quantitative yields or the phosphonium chloride may be recovered by the evaporation of the solvent. The intermediate phosphonium chloride may be washed with a solvent which will not dissolve the phosphonium chloride to remove any residual trialkylphosphine. Suitable trialkylphosphines are the normal $C_1$ to $C_{20}$ alkyls and preferably normal $C_4$ to $C_8$. The intermediate phosphonium chloride produced has the following structure:

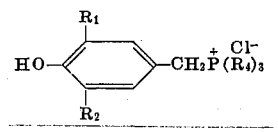

where $R_1$ and $R_2$ are lower alkyl and $R_4$ is a n-alkyl.

The foregoing phosphonium chloride intermediate may be reacted with an hydroxide or alkoxide ion in water or in alcoholic solvent to produce the corresponding zwitterion. If a water solution is used, the zwitterion will precipitate out of solution; whereas, if an alcohol is used as the solvent, water may be added to the alcohol solution to precipitate the zwitterion. Suitable hydroxides or alkoxides to use in the reaction are sodium hydroxide, potassium hydroxide, sodium methoxide, sodium ethoxide, potassium ethoxide, and the like. The corresponding zwitterion produced has the following structure:

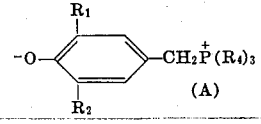

where $R_1$ and $R_2$ are lower alkyl and $R_4$ is a n-alkyl.

The hindered alkenyl phenols of the present invention are produced by reaction of the zwitterion with an aldehyde. The aldehyde which reacts with the zwitterion may be either an alkyl or aryl aldehyde. Suitable aldehydes are benzaldehyde, n-heptaldehyde, alpha-naphthaldehyde, the isomeric tolualdehydes, the isomeric chlorobenzaldehydes, acetaldehyde, propionaldehyde, isobutyraldehyde, and pivaldehyde. The reaction of the zwitterion and aldehyde is carried out in an aprotic solvent such as benzene, tetrahydrofuran, or dimethylformamide.

The present invention will be further illustrated by the following specific examples which are given by way of illustration and not as limitations on the scope of the invention.

EXAMPLE 1

Preparation of Tri-n-butyl(3,5-di-t-butyl-4-hydroxy-benxyl) phosphonium Chloride)

Tri-n-butylphosphine (40.60 g., 0.201 mole) was added dropwise during 30 minutes to a well-stirred solution of 2,6-dit-butyl-4-chloromethylphenol (50.96 g., 0.200 mole) in benzene (500 -hydroxy-benzyl) After 6 hours of standing at room temperature, the mixture was filtered; and the recovered precipitate was washed twice with benzene and then twice with ether. The product was dried under vacuum at 60° C.; it weighed 89.2 g. (97 percent yield), melted at 183°–184° C., and was shown to be the title compound by ir and nmr spectral measurements. Recrystallization from toluene gave an analytical sample in the form of tiny, snowwhite flakes, mp 186°–187° C.

Analysis: Calculated for $C_{27}H_{50}OPCl$:
C, 70.94; H, 11.03; P, 6.78; Cl, 7.76.
Found: C, 70.91; H, 11.17; P, 6.63; Cl, 7.94.

EXAMPLE 2
Preparation of Zwitterion A ($R_1 = R_2$ = t-butyl; $R_4$ = n-butyl) from Tri-n-butyl (3,5-di-t-butyl-4-hydroxybenzyl) phosphonium Chloride A solution of the phosphonium chloride (1.15 g., 2.52 mmoles) in methanol (5 ml.) was degassed by stirring while bubbling with nitrogen for approximately 10 minutes. Sodium methoxide (0.41 g., 7.5 mmoles) was added, and the mixture was then stirred and bubbled with nitrogen for an additional 5 minutes, poured into water (50 ml.), stirred until precipitation appeared to be complete, and filtered. The precipitate was washed quickly in succession with water (three washes) and anhydrous ether (four washes) and then dried at room temperature under vacuum. The white microcrystals thus obtained weighed 0.89 g. (84 percent yield) and melted at 92°–94 C. (with fast heating; slow heating gave lower melting points); this material was shown to be zwitterion A ($R_1 = R_2$ = t-butyl; $R_4$ = n-butyl) by ir, nmr, uv, and mass spectral measurements as well as by elemental analysis.

Analysis: Calculated for $C_{27}H_{49}OP$:
C, 77.09; H, 11.74
Found: C, 76.87; H, 11.79

This compound should be used immediately after preparation, since it undergoes fairly rapid decomposition on exposure to the atmosphere. The decomposition can be retarded by storing the material under vacuum.

EXAMPLE 3
Preparation of trans-3,5-di-t-butyl-4-stilbenol from Zwitterion A ($R_1 = R_2$ = t-butyl; $R_4$ = n-butyl) and Benzaldehyde A freshly prepared sample of the zwitterion (6.32 g., 15.0 mmoles) was added under nitrogen, with stirring, to a degassed solution of benzaldehyde (1.59 g., 15.0 mmoles) in benzene (60 ml.). The mixture was stirred and heated under reflux for 1.5 hours, then freed of solvent by evaporation under vacuum at ambient temperature. Fractionation of the residue under vacuum (1 mm.) through a 24-plate spinning band column gave a fraction which was shown to be mostly tri-n-butylphosphine oxide (b.p. 75°–126° C.), a fraction which was identified as trans-3,5-di-t-butyl-4-stilbenol (b.p. 176°–178° C., 2.54 g., 55 percent yield), and higher boiling fractions that were not identified. Crystallization of the stilbenol fraction from methanol-water, followed by recrystallization from petroleum ether (b.p. 30°–60° C.), gave a pure sample melting at 92.5°–93° C. The structure of the product was conclusively established by ir, nmr, and mass spectra, and by elemental analysis.

Other experiments were carried out in benzene using a longer heating time, in tetrahydrofuran, and in dimethylformamide solution. Analyses showed that substantial amounts of trans-3,5-di-t-butyl-4-stil-benol were also formed in these experiments.

EXAMPLE 4
Preparation of 2,6-di-t-butyl-4-(1-octen-1-yl) phenol from Zwitterion A ($R_1 = R_2$ = t-butyl; $R_4$ = n-butyl) and n-Heptaldehyde Equimolar amounts of the zwitterion and n-heptaldehyde were allowed to react in benzene solution under conditions comparable to those employed in the experiments with benzaldehyde (see above). After 46 hours of refluxing, solvent was removed under vacuum, and the residue was analyzed by vapor phase chromatography, ir spectrometry, and high resolution mass spectrometry. These analyses showed that 2,6-di-t-butyl-4-(1-octen-1-yl) phenol had been formed in approximately 20–25 percent yield.

The hindered alkenyl phenols which are synthesized according to the present invention may be used as stabilizers in polyolefins. When used as stabilizers in polyolefins, the hindered alkenyl phenols may be used with a sulfur-containing costabilizer compound exemplified by the thio esters such as dilaurylthiodipropionate, distearylthiodipropionate, dilaurylsulfoxydipropionate, distearyltrithiodipropionate, and other sulfur-containing compounds such as dicetyl sulfide, dicetyl disulfide and the like. The hindered alkenyl phenols as well as the sulfur-containing costabilizer compounds may be used in amounts from about 0.05 to about 1 percent by weight, with a preferred amount from about 0.1 to 0.5 percent by weight. The polyolefin polymers which may be stabilized are polymers of olefins having two to eight carbon atoms in the molecule and may suitably be exemplified by polyethylene, polypropylene, ethylene-propylene copolymers, ethylene-butene-1-copolymers, ethylene-pentene-1-copolymers and the like having molecular weights in the range from about 10,000 to about 1,000,000. These polymers are produced by polymerization of the corresponding olefins employing the Ziegler-type polymerization catalyst.

To illustrate the antioxidant properties of the hindered alkenyl phenols of the present invention, trans-3,5-di-t-butyl-4-stilbenol is compared with two commercial inhibitors. In Table I below, the data show that the compound synthesized according to the present invention in accordance with Example 3 is a superior antioxidant in a single-compound system, as well as in a synergistic system containing a thioester.

TABLE I

Polypropylene Stability Data

| Stabilizer | Wt. % | Days to Failure[a] at 115.5° C. |
|---|---|---|
| 3,5-di-t-butyl-4-stilbenol[b] | 0.5 | 17 |
| Santowhite[c] | 0.5 | 8 |
| Ionol[d] | 0.5 | 5 |
| 3,5-di-t-butyl-4-stilbenol, DLTDP[e] | 0.1, 0.2 | 33 |
| Ionol, DLTDP | 0.1, 0.2 | 20 |

[a]For 62-mil plaques in a forced-draft circulating air oven.
[b]Trans isomer.
[c]1,1-bis(4-hydroxy-2-methyl-5-t-butylphenyl)butane
[d]2,6-di-t-butyl-p-cresol.
[e]Dilauryl 3,3'-thiodipropionate.

The nature and objects of the present invention having been completely described and illustrated, what I wish to claim as new and useful and secure by Letters Patent is:

1. A composition of matter having the structure:

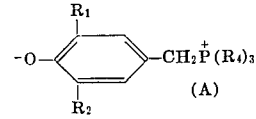

(A)

where $R_1$ and $R_2$ are $C_1$ to $C_8$ alkyl and $R_4$ is a n-alkyl.

2. A composition of matter according to claim 1 wherein $R_1$ and $R_2$ are t-butyl and $R_4$ is n butyl.

3. A composition of matter having the structure:
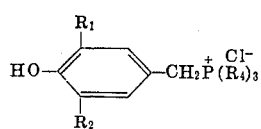
where $R_1$ and $R_2$ are $C_1$ to $C_8$ alkyl and $R_4$ is a n-alkyl.
4. A composition of matter according to claim 3 wherein $R_1$ and $R_2$ are t-butyl and $R_4$ is n-butyl.
* * * * *